INVENTOR
ALBERT J. BARACKET
BY Percy P. Lantzy
ATTORNEY

March 4, 1958 A. J. BARACKET 2,825,755

MONTAGE AMPLIFIER

Filed March 28, 1952 4 Sheets-Sheet 2

INVENTOR
ALBERT J. BARACKET
BY Percy P. Lantzy
ATTORNEY

INVENTOR
ALBERT J. BARACKET
BY Percy P. Lantzy
ATTORNEY

INVENTOR
ALBERT J. BARACKET
BY
ATTORNEY

United States Patent Office 2,825,755

Patented Mar. 4, 1958

2,825,755

MONTAGE AMPLIFIER

Albert J. Baracket, Bloomfield, N. J., assignor to International Telephone and Telegraph Corporation, a corporation of Maryland Application March 28, 1952, Serial No. 279,230

6 Claims. (Cl. 178—7.1)

This invention relates to electronic amplifier systems and more particularly to a montage amplifier system incorporated in a television or similar broadcast system.

There are many situations where it would be advantageous to show two scenes as though from separate picture pick-up units at one time on a television screen, or to show separated parts or separate views of the same scene at the same time to focus the attention of the audience on these separate segments. Another advantage of such a system would be to show more distinctly two or more separate actions that blend to make a complete picture of the players at widely separated areas in a game as in baseball and football, or enable the audience to observe two or more distinct segments or views of the same action, or to include an advertising announcement as a part of the picture. In television transmission systems heretofore proposed, such operations were accomplished by superimposing two video frame signals which resulted in an overall reduction of contrast and brightness or both. It is an object of this invention, therefore, to not only provide means for simultaneously transmitting two or more separate TV video frame signals for presentation on a receiving TV screen in the same frame, but to so transmit such signals that each of the separate video frame signals are presented simultaneously with substantially the same contrast and brightness as when they are presented separately.

Another object of this invention is the provision on the studio master control equipment of means for lap dissolving two separate and distinct video signals by fading one of the signals and bringing the other signal to a predetermined brightness to effect this overlap of signals.

Still another object of this invention is the provision whereby the operator of the studio or master control unit may select desired video signals for presentation from one of several picture pick-up units.

A feature of this invention is the derivation of a keying pulse to effect the simultaneous showing, for example, of two video frame signals in the same frame. This keying pulse may be derived from one of the picture pick-up projection units wherein is incorporated a system comprising a cathode ray electron discharge device emitting a light source developed from horizontal line scanning, a focusing lens, an opaque-transparent slide being scanned by the cathode ray device, a condensing lens, and a photo tube to respond to the presence of the scanning light passing through the opaque-transparent slide. The space division of the opaque-transparent slide determines the time relation of the two video frame signals being presented simultaneously in one frame of a television presentation.

Another feature of this invention is a biasing system controlled from the panel of the studio equipment wherein the fading out of one video signal and the bringing up to brightness of another video signal may be selectively controlled at different rates.

Still another feature of this invention is the switching arrangement which allows the master control operator to select either of two video signals, the lap dissolving of two video signals, the fading out and bringing up to brightness of two video signals, or the presentation of two video signals simultaneously in the same frame of a TV presentation.

The above-mentioned and other features and objects of this invention will become more apparent by reference to the following description taken in conjunction with the accompanying drawings, in which.

Figure 1:
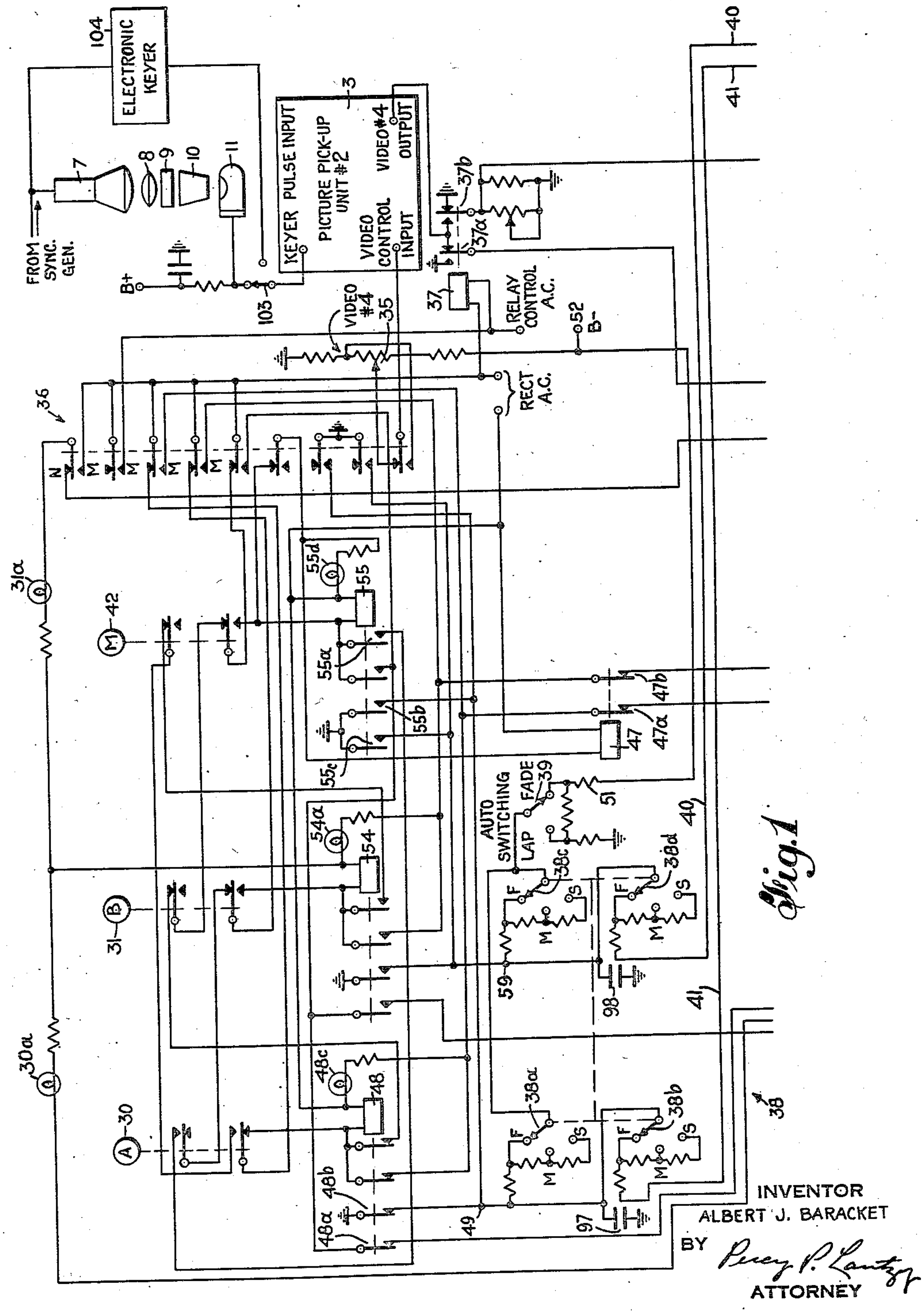
Figs. 1 and 1A show a schematic and block diagram of the control system and its association with the units of a montage system following the principles of this invention.
Figure 1A:
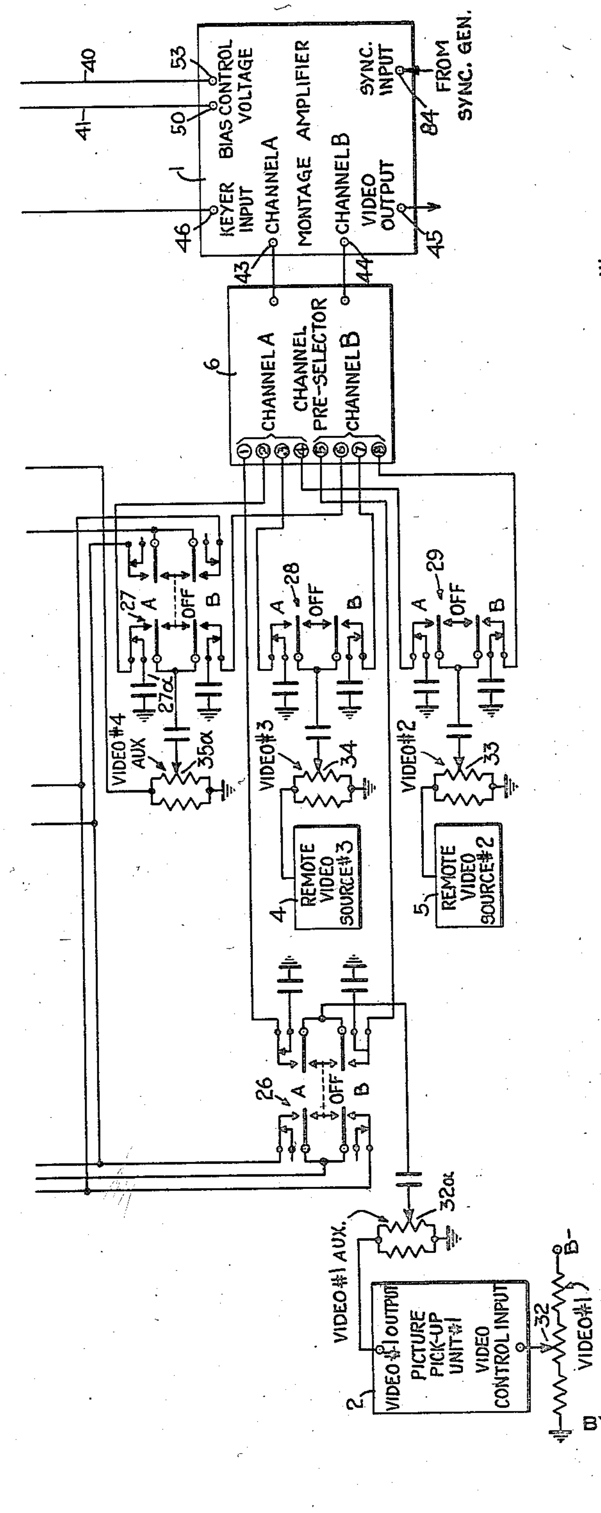

Referring to Figs. 1 and 1A, alignment therebetween established by conductors 40 and 41, there is illustrated a montage system or a master control arrangement which includes therein the montage amplifier 1, picture pick-up units 2 and 3, remote picture pick-up units 4 and 5, the controlling relays and switches, and the channel pre-selector 6 necessary to achieve the features and objects of this invention. Adjacent to or included in one of the pick-up units, for this example pick-up unit 3, is the means for deriving a keying pulse which comprises an electron discharge device of the cathode ray type 7 wherein horizontal and vertical scanning produces a source of light, a focusing or condensing lens 8, one of a number of special slides 9, or cards at the face of cathode ray device 7, a light collector 10, and a photo tube 11 with its accompanying circuit across which a pulse shaped voltage is produced corresponding in a time relation with the space relation of the opaque and transparent segments contained in each slide or picture frame card.

The slide or card is the major element of the means for deriving the keying pulse. The spacing of the opaque and transparent segments may be varied to suit a predetermined arrangement of video signals in one frame, this predetermined arrangement producing a keying pulse which cuts on and off the proper video channel to establish the predetermined arrangement of video signals in the single frame of the TV presentation.

Figure 2:
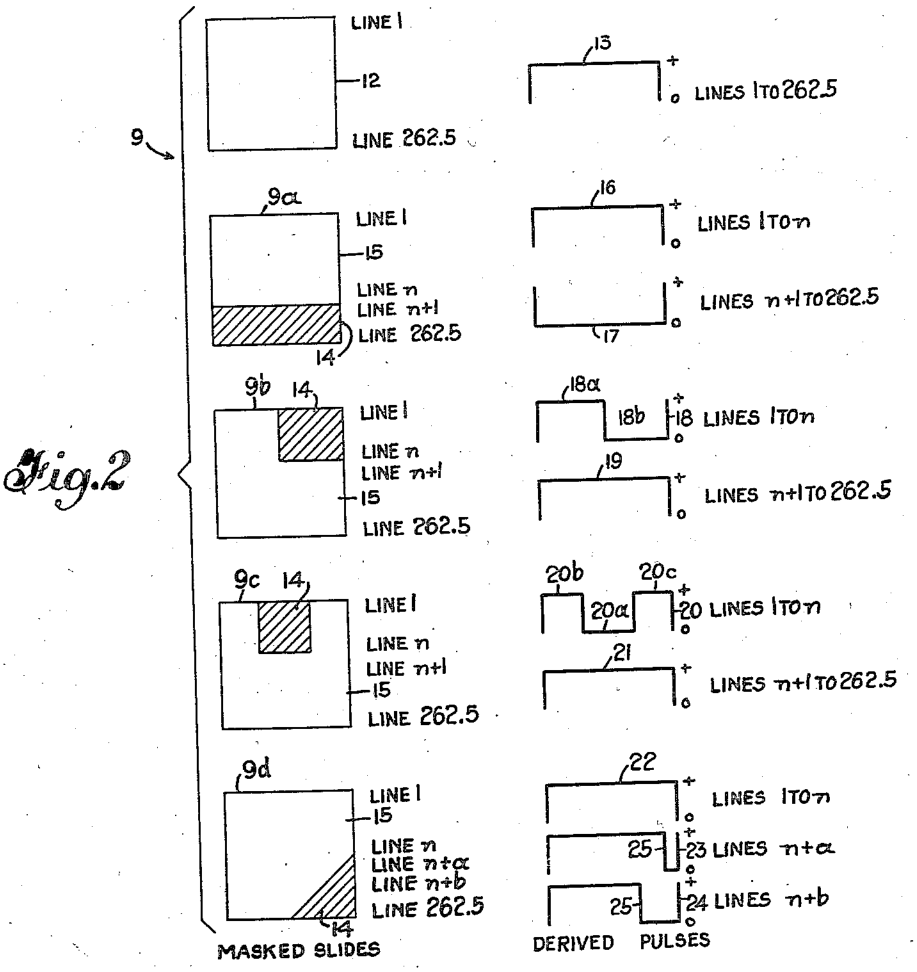
Fig. 2 illustrates representative space arrangements of the special opaque-transparent slides that may be employed with the keying pulse deriving circuit and the corresponding keying pulses produced therefrom.

Several arrangements of the opaque and transparent segments of the slide or card and the pulses produced by the horizontal line scanning of these segments are shown in Fig. 2 compared to a completely transparent slide or card 12 and the keying pulse 13 derived therefrom. The pulse 13 represented therein is identical for each line of scanning and indicates equal light intensity as the line of light scans or traverses the entire width of the slide. The masking or picture frame dividing of a transparent slide produces an opaque-transparent slide, examples of which are shown at *9a*, *9b*, *9c*, and *9d*, Fig. 2, wherein the segment 14 is transparent and the segment 15 is opaque. Line scanning of slides as herein shown, or any other frame division, or combinations thereof, produces voltage pulses having a positive sense when the scanning line is in the opaque portion and a negative or less positive sense when the scanning line is in the transparent portion. The pulses derived therefrom are acted on by the keyer channel of the montage amplifier 1, Fig. 3, to present the input keyer pulse to video channel A and an inverted input pulse to channel B. Therefore, the action of a positive pulse presented to the keyer channel would be to key on channel A and key off channel B for the duration of the pulse, or series of pulses as the case may be, allowing the passage of signals presented to channel A, while a negative pulse produced by an opaque portion will key off channel A and key on channel B providing a time sharing of the signal frame or output spectrum between selected video signal sources as established by the division of the slide or picture frame. Flexibility is provided herein to reverse the keying of the channels as hereabove described.

Slide *9a*, Fig. 2, produces two pulses 16 and 17 dependent upon the location of the scanning line. As shown, a pulse 16 having a positive sense is produced by the scanning lines 1 to *n*, while a pulse 17 having a negative sense is produced by the scanning lines $n+1$ to 262.5. Slides or picture frames 9*b*, 9*c*, and 9*d* illustrate arrangements of the slides wherein the full width need not be masked. Accordingly, keying pulses are derived substantially as indicated in Fig. 2, the circuitry employed in the montage amplifier 1 having a response fast enough to substantially follow the changes therein noted. Slide *9b* develops a pulse 18 containing both positive and negative sense pulses 18*a* and 18*b*, respectively, by scanning lines 1 to *n* to provide time sharing in this portion of the signal frame while the remaining portion of the picture frame produces a positive sense pulse 19, the overall result providing a time sharing of the signal frame between two selected video signal sources. Slide 9*c* develops a pulse 20 having the negative sense pulse 20*a* in the center thereof bounded by the positive sense pulses 20*b*, corresponding to the masked portion of the slide, by scanning lines 1 to *n*, the remaining portion of the picture frame producing a positive sense pulse 21. Slide 9*d* develops a pulse 22 having a positive sense between line 1 and line *n*, and a series of pulses 23 and 24 between line *n* and line 262.5 having negative sense pulse 25 with an increasing time duration corresponding to the increasing width of the masked or opaque portion 14. It will be apparent that the positive pulses 16, 19, 21, and 22 are substantially identical to the pulse 13 produced by the opaque slide and associated scanning lines.

Figure 2A:
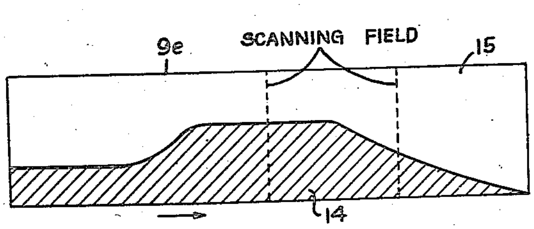
Fig. 2A illustrates a modified form of slide to effect by movement thereof a variation in the time division between two video frame signals desired for a single frame.

Following the principles herein set down, production of keying pulses and their proper relationship to the masked slides may be developed for any arrangement of masking or combinations thereof. Another variation in the slides, *9e*, Fig. 2A, provides for employment of a picture frame and having a length longer than the actual proportional frame dimensions and a variable line of demarcation between the opaque and transparent portions 14 and 15 whereby the time sharing of two video signals in the signal frame may be varied. This variable time sharing is accomplished by sliding this picture frame card at a predetermined rate across the scanning field of the light beam. Efficient operation of the circuitry to be described can be augmented by the use of clamp circuits at the control and suppressor grids of devices 61 and 62 or by D.-C. coupling to these grids.

The switches and controlling relays are shown in detail in Figs. 1 and 1A wherein the respective switches and relays are the video pushbutton selectors 30, 31, and 42, normal-montage switch 36, relays 37 and 47 and their associated contacts 37*a*, 37*b*, and 47*a*, 47*b*, respectively, auto switching 39, and fade rate switch 38, showing in detail the four sections 38*a*, 38*b*, 38*c*, 38*d*, incorporated therein. Also indicated are the video control potentiometers 32, 33, 34, 35 and the auxiliary video potentiometers 32*a* and 35*a* which control the bias and output voltage of the video signal sources 2, 5, 4, 3, respectively.

With switch 36, Fig. 1, in the "normal" or "N" position, relay 37 is inactivated establishing a direct connection from the video sources 2, 3, 4, and 5 to their corresponding double throw or tumbler switches 26, 27, 28, and 29, as shown. These double throw switches provide to operator an opportunity to pass any one of the video signals through the channel preselector 6 to either channel A or B of the montage amplifier 1, depending upon the position of switches 26, 27, 28, or 29. While a signal, from say video source 2, is passing through channel A of montage amplifier 1, as established by switch 26 being in position A and pushbutton 30 being depressed as indicated, the operator may prepare to present another signal, from say video source 4, by placing switch 28 in position B. When the operator is prepared to present this second signal, he depresses pushbutton 31, inactivating channel A and activating channel B for presentation of the second or pre-set signal to the signal frame. The change over from one video signal to the other by pushbuttons 30 and 31 is accomplished by fading the signal present completely out and bringing the selected signal up to full brightness at three different rates provided by the settings of the four sectioned-ganged fade rate switch 38 (38*a*, 38*b*, 38*c*, and 38*d*) and the auto switch 39. Switch 39 provides a connection between a negative potential source and the fade rate switch 38 establishing the proper operating bias, in either "lap" or "fade" position, as selected, on the channel amplifiers of the montage amplifier 1 through conductors 40 and 41. Depressing pushbutton 42 establishes a substantially equal bias for presentation to both the channel amplifiers, thereby providing the operator with a means to manually lap dissolve two video signals selected from any of the four video signal sources with switch 39 in the "lap" position. This manual lap dissolving process being accomplished by manipulation of the external video control potentiometers 32, 33, 34, and 35, respectively, video selection being accomplished by switches 26, 27, 28, and 29, as hereinabove described. Employment of a pushbutton 42 and switch 39 in the "fade" position provides the operator with the opportunity to manually accomplish superimposition of two selected video signals.

The channel pre-selector 6 hereinabove mentioned provides a mixing function whereby eight possible signal inputs are combined for passage through the two channel amplifiers by the montage amplifier 1. The circuitry involved in the pre-selector 6 includes eight cathode followers wherein the cathode followers have their cathodes paralleled in groups of four, the output from each group being presented to their respective channels through terminals 43 and 44. The input signals are applied to the control grids of the cathode followers in the proper group to cooperate with switches 26, 27, 28, 29 and pushbuttons 30 and 31 for the selection of a specified video signal to be passed through the desired montage amplifier channel. It is possible with manual operation, as selected by pushbutton 42, to combine a plurality of video signals from sources 2, 3, 4, and 5 in a predetermined manner by potentiometers 32, 33, 34, and 35 so that all or any of these signals will be present in the signal frame at the video output terminal 45. The presentation in the signal frame may consist of superimposition of two video signals with a third signal being lap dissolved with respect to these two signals, superimposition of two video signals with a third signal fading out with respect to these two signals while a fourth signal is being brought to a predetermined brightness prior to the complete fade out of the third signal, or any desired combination thereof.

When montage operation is selected by switch 36, relay 37 is operated which places the keyer pulse output of pick-up unit 3 on the keyer channel terminal 46 and at the same time deactivating the video #4 output. The keyer pulse will allow simultaneous sharing of a single signal frame by two video signals selected from pick-up unit 2, video source 4, or video source 5, selection of the video units being provided by switches 26, 28, or 29, as desired. The push button controls 30, 31, and 42 are made inoperative and locked in position when in montage operation, therefore, fading and overlapping is impossible, brightness and contrast being controlled by the biases established by the circuitry of switch 38. Employing the type of montage system herein described, wherein there is a time sharing between selected video signals for presentation in a single signal frame, provides a maintenance of picture contrast in both segments of the shared signal frame enjoyed by a single video signal in a signal frame. Therefore, when in montage operation, there is no decrease in contrast or brightness of the TV presentation.

As shown, the controls are set for "normal" operation by switch 36, and video channel A is selected to present its information with the ganged fade rate switches 38 set at fast and the auto switch 39 set at the "fade" position. These settings on the latter two switches provide for fast interchange between channel A and channel B signals if the channel B signal is selected by pushbutton 31. With the operating condition as established by switch 36, relay 37 is inoperative allowing the video signal from pick-up unit 3 to traverse channel A or B, depending upon the setting of switch 27, and the keyer channel input 46 is grounded or otherwise shorted.

Operating normally with video signal A selected for TV presentation from any selected video source, relay 48 is made operative by depressing pushbutton 30. Contact 48*a* assures that the activating voltage is maintained across relay 48 to hold the remaining contacts in position when pushbutton 30 is released. Contact 48*b* places a ground at point 49 to produce the proper bias for the channels contained in the montage amplifier 1 through conductors 40 and 41 which provides the proper operating bias for channel A and inactivating bias for channel B, and to assure proper fading out of signal on channel A if channel B should be selected.

With the selection of channel A, the application of a ground at point 49 provides that section *b* of switch 38 present a more positive voltage through conductor 41 to terminal 50 which allows video channel A to operate. The network consisting of sections *c* and *d* of switch 38, the resistive network 51 of the auto switch 39, and the negative bias at terminal 52 provides a voltage divider of such a relation that a negative bias is passed through conductor 40 to terminal 53, and hence to video channel B, rendering it inoperative. If channel B is selected, the polarity of the bias voltages applied to terminals 50 and 53 substantially reverse, making the now operative channel inoperative and so forth. However, it is not an instantaneous reversal of polarity but a rate of reversal which will be discussed further in connection with Fig. 3, allowing the channel A presentation to fade out and channel B presentation to come up to full brightness after channel A signal has completely faded out, the rate of change being controlled by the setting of switch 38 and the value of the RC time constants employed therein. In selecting channel B, relay 48 is made inoperative and relay 54 is activated producing the reversal of polarity in conductors 40 and 41 by making the necessary circuit changes in the controlling circuit, substantially as indicated hereabove in connection with channel A.

While the system is operating normally, the operator of master control may desire to overlap or superimpose two TV signals in the same frame. To accomplish this, the pushbutton 42 is operated which clears previous pushbutton settings by activating relay 47 and activates relay 55. As mentioned in connection with contact 48*a* of relay 48, contact 55*a* provides a holding means for relay 55 when the pushbutton 42 is released. Contact 55*b* of relay 55 places a ground at point 49 while contact 55*c* places a ground at point 59 providing a means for establishing a more positive bias at both terminals 50 and 53 when the auto switch 39 is set at the lap or fade position. The contrast of the overlapped signals, or the fading of two signals with respect to each other, or the fading of one signal with respect to the overlapped signals may be controlled manually by potentiometers 32, 33, 34, and 35 dependent upon video signals selected by switches 26, 27, 28, and 29. The biasing to accomplish overlapping and fading as herein described and for establishment of channel bias in montage operation may be accomplished by employing the proper negative voltage source at terminal 52, such as −150 volts, and the proper values of resistors contained throughout the controlling circuit in connection with switches 38 and 39, plus an RC time constant present in each of the channels to be discussed hereinbelow. The value of these various components will depend upon the requirements established for a particular application.

Now changing from normal operation to montage operation by a flip of switch 36, relay 37 is energized allowing the simultaneous presentation of two video signals in a time relation dependent upon the space function of the selected slide, examples of which are shown in Figs. 2 and 2A. The operation of switch 36 to the montage position inactivates the previously discussed controls by removing the rectified or activating A.-C. from one side of the relays 48, 54, and 55 although pushbuttons are mechanically locked in position. When switching to montage operation, the pushbutton conditions, as may be established when switch 36 is in the normal position, are not disturbed. For instance, when switching back to normal position after the montage operation, the program previously on is resumed instantaneously without further operation of the pushbuttons 30, 31, and 32. Furthermore, while in montage operation it is possible to operate the switches 26, 27, 28, or 29 to change the video signals being montaged by the montage amplifier 1.

The controlling circuit includes the lamps 48*c*, 54*a*, and 55*d* for illumination of the pushbuttons 30, 31, and 32, respectively, when these pushbuttons are depressed while switch 36 is in the normal position. When switch 36 is placed in the montage position, both lamps 48*c* and 54*a* are illuminated to give the operator an indication that both channels A and B are in use. Lamps 30*a* and 31*a* are so located in the assembled apparatus that when they light up the operator will have a visual indication of which pick-up unit is supplying video signal to the montage amplifier in either normal or montage operation.

Operation of relay 37 removes contacts 37*a* and 37*b* from the indicated position to the other position, removing video #4 output from the input to channel pre-selector 6. At the same time keyer terminal 46 is ungrounded and the time function keying pulse is applied thereto from pick-up unit 3 and its associated pulse deriving circuit as hereinabove described.

Figure 3:
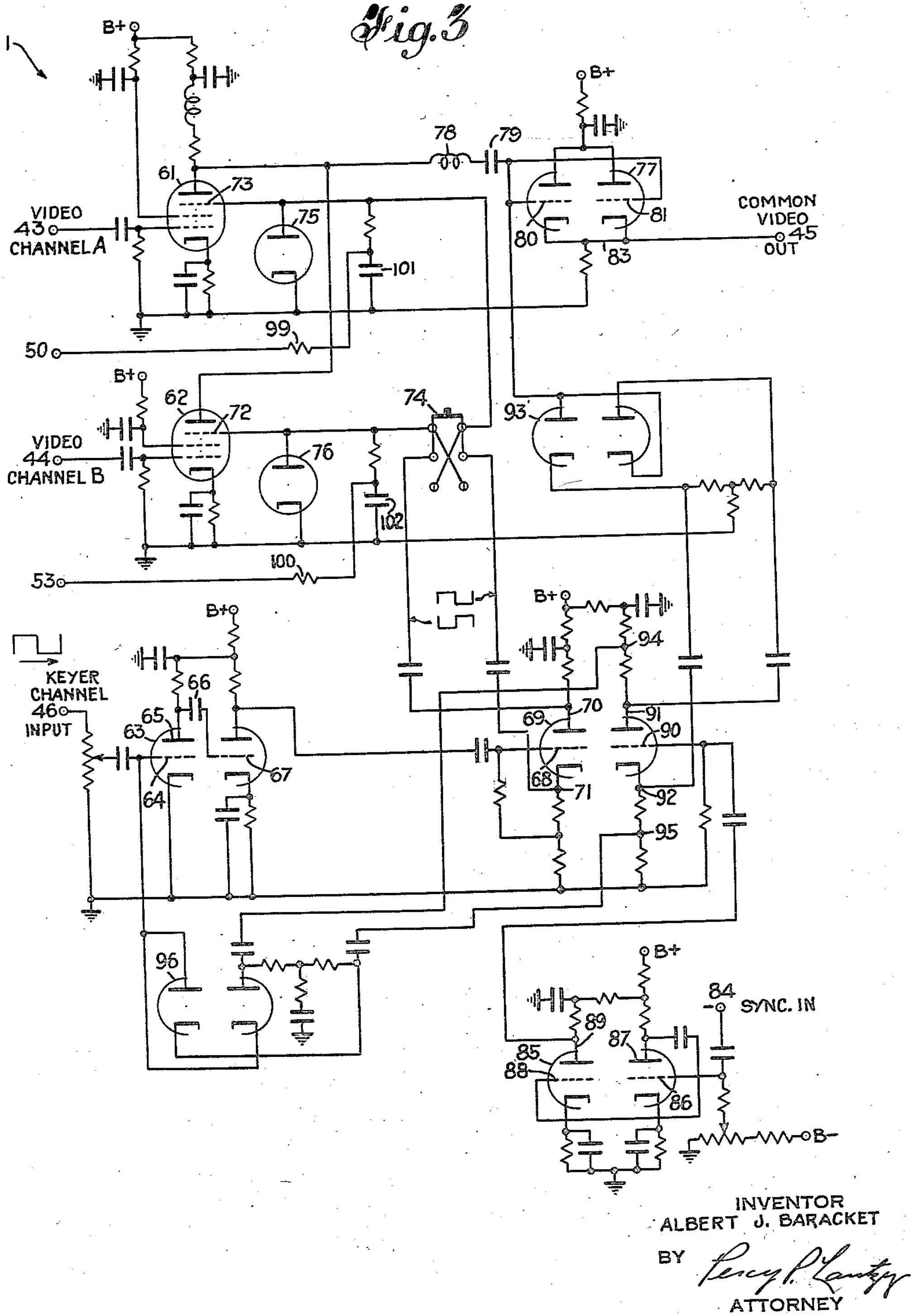
Fig. 3 is a schematic diagram of the montage amplifier of Fig. 1.

Referring to Fig. 3, a schematic diagram of the montage amplifier 1 is illustrated consisting principally of two wide band amplifier channels which may accept any pair of TV video signals, a common output device, and a keyer channel to accept a timing or keying signal from one of the above-mentioned pick-up units, shown herein to be pick-up unit 3, the time function dependent upon the space function of any one of a number of selected slides which may be masked in a predetermined manner to be opaque in some sections and transparent in others, examples of which are shown in Figs. 2 and 2A.

The embodiment herein illustrated employs two wide band amplifiers 61 and 62, one in each channel, which when the system is in montage operation are keyed on and off by a keying pulse passed through the keyer amplifier 63 which elevates the keying voltage to a level sufficient to provide the desired keying on and off of the two amplifiers 61 and 62. When a positive-going voltage is applied to the grid 64 of amplifier 63, the current therethrough is increased causing the voltage at the plate 65 to decrease. This decreasing voltage is coupled through condenser 66 to the grid 67 of the amplifier 63 causing a decrease of current flow therethrough which in turn produces a positively-going or increasing voltage, amplified with respect to the incoming positive pulse. The increasing voltage is applied to the grid 68 of the keyer driver electron device 69, causing a negatively-going voltage to appear at the plate 70 and a positively-going voltage to appear at the cathode 71. Voltage pulses are shown for the leads to plate 70 and cathode 71 including both positive- and negative-going voltages, indicating a 180° phase shift in one of these pulses as compared to the pulse applied at terminal 46. This pulse applied to terminal 46 may be derived from a card substantially as shown in 9*a* of Fig. 2. The voltage at plate 70 is applied to the suppressor grid 72 of the channel amplifier 62 while the voltage at cathode 71 is applied to the suppressor grid 73 of the channel amplifier 61 when the reversing switch 74 is in its normal position as shown. The application of these voltages from the electron device 69 will turn channel A on and channel B off in a manner and for the proper duration dependent upon the selected slide 9 employed to derive the keying pulse. When the keying pulse becomes a negatively-going pulse, the voltages are reversed at grids 72 and 73, keying off channel A and keying on channel B. The grids 72 and 73 are assured of receiving pulse shaped voltages of the proper amplitude due to the cooperation of the D.-C. restorer or clamping circuit comprising electron discharge devices 75 and 76, respectively.

The resultant signal from both amplifiers 61 and 62 is applied to the common output electron discharge device 77, through an inductance 78 and a condenser 79, on the grids 80 and 81 in parallel. This common output device 77 presents a combined frame portion of the signals of selected video signal sources for transmission in the same signal frame at the terminal 45 from the cathode 83. The signal frame consists of each of the two video input signals arranged in accordance with the spaced relation of the opaque and the transparent sections of the special or selected slide 9 of Fig. 1, examples of which are shown in Figs. 2 and 2A.

Composite synchronizing pulses from a synchronizing pulse source are conducted to terminal 34 of the montage amplifier 1, having a negative sense. These synchronizing pulses are amplified by electron discharge device 85 wherein the negative synchronizing pulse applied to the grid 86 causes a positive pulse at the plate 87 which is coupled to the grid 88 producing an amplified negative pulse at the plate 89. The voltage at plate 89 is coupled to the grid 90 of the keyer driver 69, this section of which provides a reference bias and a means for applying the amplified synchronizing pulses to clamp the signal level at various points in the montage amplifier circuit. From the plate 91 and the cathode 92, a positive and negative voltage, respectively, are applied to the clamping device 93 for clamping of the video signal at the grid 80 of the common output device 77 at a desired predetermined level. The same thing may be accomplished at grid 64 of keyer amplifier 63 by removing a positive voltage from point 94 and a negative voltage from point 95 and applying these voltages to the clamp tube 96 and hence to clamp the keying pulse at grid 64. These two clamping operations assure that the various pulses or signals start from a certain predetermined level prior to activating their associated circuitry, thus presenting the proper voltage level at the output terminal 45 for transmission and simultaneously producing a synchronizing influence on the montage amplifier.

The changes occurring in the control circuits of Figs. 1 and 1A by operation of the pushbuttons 30 and 31 in conjunction with the fade rate switch 38 and the auto switch 39 have been fully discussed hereinabove. However, it was mentioned that the fading out and bringing up to brightness of the two signals was not an instantaneous occurrence but was accomplished at a predetermined rate. The fading rate, as it is herein referred to, is established by the double time constant comprising the selected resistors on the switch 38 and the condensers 97, 98 in conjunction with the resistors 99, 100 and condensers 101, 102, the former time constants being shown in Fig. 1 and the latter in Fig. 3. The value of these time constants which come into play for control of the video channels by the selection of the master control operator are determined by the particular application and results desired therein.

Figure 5:
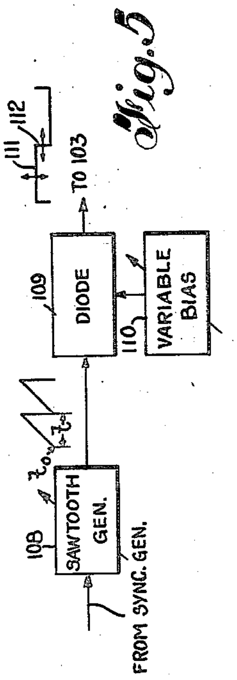
Figs. 4 and 5 illustrate a multivibrator type circuit and a sawtooth-diode pick-off circuit, respectively, for application as the electronic keyer of Fig. 1.
Figure 4:
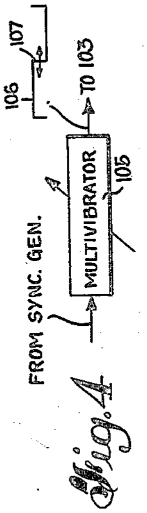

Switch 103, shown in Fig. 1, provides a means for selecting an alternate keying pulse or control signal source. Thus an all-electronic system may be provided by incorporating as the control signal source the electronic keyer 104. The circuitry incorporated therein may be any source of spare pulses whose time ratio of positive and negative portions may be varied. Figs. 4 and 5 indicate two alternate systems that may be incorporated therein to provide a time sharing between two video signals substantially as described above in connection with the optical system incorporating the masked cards.

Fig. 4 indicates a variable multivibrator 105 which is triggered from the sync generator. The time constants incorporated in such a multivibrator circuit are made variable to produce a keying pulse 106 whose positive leading edge 107 is time varied by these variable time constants. This pulse output would then be applied as described above to the keyer pulse input of pick-up unit 3.

Fig. 5 indicates a further system wherein a sawtooth generator 108 is activated by signals from the sync generator. The sawtooth coupled therefrom has a time base equivalent to the time of the scanning field with a peak voltage of a suitable value. This sawtooth is then presented to the diode type electron discharge device 109, the circuitry thereof being arranged to conduct at time zero and will cut off at a particular time, as established by the variable bias 110 applied to the cathode of the diode 109. The resultant keying pulse 111, therefore, may have its leading edge 112 varied in time dependent upon the bias applied to diode 109 and at the same time will control the amplitude of the pulse 111, as will be apparent to those skilled in the art. This keying pulse will likewise be applied as described above to the keyer pulse input of pick-up unit 3.

This basic system and principle may be extended to handle more than two video signals for simultaneous presentation in a TV frame by increasing the number of montage amplifier channels and by producing a keying pulse to aid in the required simultaneous presentation, both changes requiring an expansion of the present electrical and mechanical apparatus. As hereinabove described, it is possible to transmit more than two video signals at a time in one signal frame by overlapping two picture signals and fade one signal out partially while bringing a third and possibly a fourth picture signal up to brightness, presenting three and possibly four picture signals simultaneously on one signal frame.

While I have described above the principles of my invention in connection with specific apparatus, it is to be clearly understood that this description is made by way of example only and not as a limitation to the scope of my invention as set forth in the objects thereof and in the accompanying claims.

I claim:

1. In a television system, at least three video signal sources, an amplifier circuit including two signal amplifying channels for combining certain frame portions of the signals of selected ones of said video signal sources for transmission in the same signal frame, channeling means for applying signals of said selected sources selectively to said amplifying channels, means for producing control signals in accordance with a desired division of said signal frame, and selective means for applying said control signals directly to each of said amplifying channels for controlling conduction of signals of said selected sources therethrough according to said frame division, said channeling means for applying signals comprising switching means, mixing means, and means for manually controlling the video level of said video signal sources prior to presentation to said mixing means, said switching means being arranged for selection of signals from said video signal sources for conduction through said mixing means for application selectively to said amplifying channels, said switching means comprising a plurality of pushbuttons for selection for a particular one of said amplifying channels, one of said pushbuttons providing establishment of substantially equal bias on said channels for manual control of selected video signals for a superimposition, lap dissolve, or fade out presentation in said signal frame, a fade rate switch and an auto switch coupled between said pushbuttons and said amplifying channels including means having a double RC time constant providing three different rates of interchange when changing from one channel to the other channel of said amplifier circuit by actuation of said pushbuttons.

2. In a television system according to claim 1, further including a normal-montage switch to provide selection of video signals to be presented to a particular channel of said amplifier circuit and to provide an automatic time sharing of said signal frame by selected video signals, and double throw switches coupled between said video signal sources and said mixing means cooperating in selecting the channel of said amplifier circuit through which selected video signals may be conducted.

3. In a television system according to claim 2, wherein said mixing means includes eight cathode followers in groups of four, the cathodes of said groups being connected in parallel and coupled to their respective channel of said amplifier circuit, the input to said groups being coupled by the proper throw of said double throw switches to the respective grids of said cathode followers.

4. In a television system, a plurality of video signal sources, an amplifier circuit for combining certain frame portions of the signals of selected ones of said video signal sources for transmission in the same signal frame, channeling means for applying signals of selected sources to said amplifier circuit, means for producing control signals in accordance with a desired division of said signal frame, and selective means for applying said controlling signals directly to said amplifier for controlling conduction of signals of said selected sources according to said frame division, said channeling means comprising switching means, mixing means and means for manually controlling the video level of said video signal source prior to presentation to said mixing means, said switching means being arranged for selection of signals from said video signal source for conduction through said mixing means for application to said amplifier circuit, said switching means comprising a plurality of pushbuttons for selection for a particular portion of said amplifier circuit, one of said pushbuttons providing establishment of substantially equal bias on said portions for manual control of selected video signals for a superimposition, lap dissolve, or fade out presentation in said signal frame, a fade rate switch and an auto switch coupled between said pushbuttons and said amplifier circuit including means having a double RC time constant providing three different rates of interchange when changing from one portion to the other portion of said amplifier circuit by actuation of said pushbuttons.

5. In a television system according to claim 4, further including a normal-montage switch to provide selection of video signals to be presented to a particular portion of said amplifier circuit and to provide an automatic time sharing of said signal frame by selected video signals, and double throw switches coupled between said video signal sources and said mixing means cooperating in selecting the portion of said amplifier circuit through which selected video signals may be conducted.

6. In a television system according to claim 5, wherein said mixing means includes eight cathode followers in groups of four, the cathodes of said groups being connected in parallel and coupled to their respective portion of said amplifier circuit, the input to said groups being coupled by the proper throw of said double throw switches to the respective grids of said cathode followers.

References Cited in the file of this patent

UNITED STATES PATENTS

| | | |
|---|---|---|
| 2,164,297 | Bedford | June 27, 1939 |
| 2,193,869 | Goldsmith | Mar. 18, 1940 |
| 2,240,420 | Schnitzer | Apr. 29, 1941 |
| 2,490,561 | Ussler | Dec. 6, 1949 |
| 2,510,714 | Patremio | June 6, 1950 |
| 2,546,338 | Glasford et al. | Mar. 27, 1951 |
| 2,611,819 | Serrell | Sept. 23, 1952 |
| 2,613,263 | Hilburn | Oct. 7, 1952 |
| 2,653,186 | Hurford | Sept. 22, 1953 |
| 2,697,746 | Kennedy | Dec. 21, 1954 |